Patented Mar. 13, 1923.

1,448,515

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

TREATMENT OF MINERALS.

No Drawing.   Application filed August 26, 1922.  Serial No. 584,572.

*To all whom it may concern:*

Be it known that I, WALTER O. BORCHERDT, a citizen of the United States, residing at Austinville, in the county of Wythe, State of Virginia, have invented certain new and useful Improvements in the Treatment of Minerals; and I do hereby declare the following to be a full, clear, and exact description of the invention, such as will enable others skilled in the art to which it appertains to make and use the same.

This invention relates to the treatment of minerals, and has for its object the provision of certain improvements for promoting various mineral treatment operations in which the mineral undergoing treatment is associated with colloidal constituents in a mineral pulp.

The mineral treatment operations to which the present invention is advantageously applicable embrace a wide field and include such operations as aim to segregate a particular kind or class of constituent or constituents of the mineral, such, for example, as concentration, classification, dehydration, thickening, filtration, etc. Throughout this specification and the appended claims, I have used the word "concentration" in a broad sense for describing any process wherein the purpose is the separation of one or more valuable minerals, or of their valuable constituents, from one or more less valuable (usually waste) minerals; or the separation of valuable minerals, or of their valuable constituents, from one another, and, therefore, including not only mechanical methods of preparation, by which the mineral particles are rearranged in fractional products without intrinsic alteration, but also such chemical or quasi-chemical methods of separation as depend upon amalgamation with mercury, cyanidation, chlorination, distillation, sublimation, oxidation, reduction, solution in acids, alkalies or other reagents; by which the valuable mineral, or its valuable constituent, although changed in form, is separated from the other minerals with which it was originally associated, and is recovered in an alloy, salt, distillate, sublimate, metal, oxide, or chemical compound, etc., in which it exists in greater proportion than in the original mineral mixture.

While I shall, herein, for the purpose of simplicity, generally use the singular number in mentioning the valuable minerals, it will be understood by those skilled in the art that in some instances more than one valuable mineral species exists in a given mineral mixture or pulp, and that it may be desirable to produce more than one kind of concentrate or product therefrom, as by a combination or succession of concentrating steps of the same or different kinds, with the result that each such concentrate contains, respectively, a greater proportion of some one mineral species or of its valuable constituent than the others, or than the original mineral mixture or pulp.

Since my invention is applicable to the preparation of many kinds of mineral mixtures for various mineral treatment operations (separative treatments), such, for example, as concentration, I wish to be understood when referring to "mineral pulp" as including in this term mixtures of natural or artificial minerals with a liquid, and, therefore, comprehending ores, tailings, middlings, smeltery slags, flue dusts, fumes, furnace products, manufactured materials, foundry or factory sweepings or similar debris, coal, coke, sand, gravel, concrete aggregate, rock crushed for agricultural purposes or for fertilizer manufacture, oil-shale, oil rock, oil-sand, etc., when mixed with a liquid to form a pulp.

The word "mineral," as herein used, is to be understood as including inorganic substances of substantially constant chemical composition occurring naturally in the crust of the earth; such inorganic but artificial substances analogous in structure and use to natural minerals, and which, by extension of thought are in practice classed as minerals, and also such substances found in the earth as are organic in the sense that they are supposed to owe their origin to the plant or animal life of past geological ages, but are now classed as mineral. It will therefore be understood that I intend to include in the word "mineral" not only the well recognized natural minerals, metallic and non-metallic, but also metals, elements, smeltery slags, refractory materials, abrasive substances, glass, ashes, flue-dusts, foundry or factory sweepings or similar debris, coal, coke, bitumens, petroleum oils, etc.

For the purposes of explanation, the present invention will be particularly described as applied to the concentration of minerals, and the understanding of the invention derived from this description will enable those skilled in the art to successfully apply the principles of the invention to other mineral treatment operations.

Certain general principles are of universal application in the concentration of valuable minerals or of their valuable constituents from mixtures. All such mixtures must be prepared for concentration, usually by crushing, grinding, screen sizing or hydraulic classification, or by one or more of these steps. By such methods, a considerable part of the mineral mixture is reduced within a range of particle size which renders it amenable to treatment by one or more of the well-known processes of concentration. However, it is inevitable that in so preparing the material, even by the most refined methods of graded crushing and classification, a part of the mineral mixture is ground so fine that, taken together with the fine particles resulting from blasting and other mining and handling operations, it constitutes what is known in the art as "slimes". Slimed material is, of course, not of uniform particle size. In fact, the range of particle size in slime is probably quite as great as, and may be much greater than, the proportionate range of particle size in the other fractional parts into which the mineral mixture is divided. Likewise, the slimed material may have approximately the same chemical composition as the original material or mineral mixture, or it may be that certain of the mineral constituents in such original material or mineral mixture, by reason of properties peculiar to them, or developed in them to a greater degree, may "slime" to a greater extent, and, therefore, be present in the "slimes" in greater proportion. The fact remains, however, that slimed material is always present in normally prepared mineral mixtures, and it always presents special problems in handling and treatment. In some special cases, it is desirable to slime the entire mineral mixture before concentration, but usually that is not desired, and it is necessary simply to apply to the slimed portion of the mixture such special methods of concentration as may be found economically available.

A portion, be it large or small, of every slime, may be characterized as colloidal, and it is with this colloidal material that I have dealt in the discoveries which form the basis of the present invention.

It is well known that colloids and colloidal slimes, both organic and inorganic, often are present in mineral pulp, and when present in considerable amount, may have an unfavorable effect upon the concentration of such mineral pulp. When considerable amounts of colloids or colloidal slimes are thus present, it is usually necessary to operate in a more dilute pulp. The colloidal matters present in a mineral pulp are probably derived for the most part from the gangue or non-valuable particles of the mineral mixture, although it is not unlikely that valuable mineral particles may also be present in the pulp in the form of colloids. Such colloidal matters may also be introduced with the milling water which is used to form the mineral pulp, and this source of colloidal matters may be considerable during periods of heavy rainfall when surface waters containing mud and other suspended matters and heavily charged with both organic and inorganic colloids, run into the source from which the milling water is customarily taken.

The colloidal matters may be present as pure colloids, organic or inorganic, or in a state bordering on the so-called "coarse suspensions". Throughout this specification and the appended claims, I intend to embrace in the expressions "colloids", "colloidal slimes" and "colloidal constituents" both true colloids and those quasi or borderland substances which may not be truly colloidal but partake of the qualities of, or resemble, colloids, and without regard to the sources from which such colloidal matters are derived. Thus, for the purposes of the present invention, the colloidal constituents may be considered as ranging from just above the molecular size upward through the class of so-called suspensoids which, while possibly not true colloids, still, because of their relatively large specific surface, exhibit some, if not all, of the properties of colloids, and are capable of existing in both the sol or gel state, or of being dispersed and coagulated or flocculated and deflocculated. By a colloidal slime, therefore, I mean a material which is not necessarily a true colloid, but which exhibits colloidal characteristics to a sufficient degree to make it amenable to the manipulation hereinafter described.

It has heretofore been proposed to treat such mineral pulps, containing considerable amounts of colloidal slimes, with a coagulating or flocculating agent, in order to neutralize in part the objectionable effect of such slimes, but the coagulated or flocculated colloidal constituents remain admixed with the mineral pulp and often seem to form therewith adsorption compounds or colloidal complexes wherewith the mineral particles are entangled or enmeshed and the mineral treatment operation prejudiced thereby, as well as, in some instances, by the coagulating or flocculating agents which remain in solution in the mineral pulp. It has also been heretofore proposed to deflocculate the colloidal constituents in a mineral pulp preparatory to a mineral treatment operation, but here again the deflocculated colloidal constituents, as well as the deflocculating agent when used, remain admixed with the mineral pulp during the subsequent mineral treatment operation. The removal of "slimes" from a mineral pulp containing considerable amounts of colloidal slimes has also been heretofore proposed and practiced in what is generally known as "desliming" operations.

As the result of my investigations, I believe that the injurious action on the concentrating operation of colloidal matters present in the mineral pulp may result from their presence in the mineral pulp, or may be due to their attachment to, or adsorption by, certain minerals of the pulp, or the reagents introduced into the pulp to effect or assist concentration, or may be due to their combination, chemically, with such reagents, thus neutralizing them or delaying or inhibiting the action which they are intended to bring about, or may be due to their affecting the density or viscosity of the pulp, the settling rate of the mineral particles, the liquid-holding capacity of the mineral particles, the entaglement or other form of aggregation of the mineral particles, the conductivity for heat or electricity or the magnetic permeability of the mineral mixture, or in other, and less obvious ways. Thus, the colloidal constituents of the mineral mixture may interfere with its effective screen sizing or classification, or with leaching, percolation, filtration, or similar steps employed for concentration or ancillary purposes, as by filling the pore spaces of certain minerals, or the interstitial spaces in the mineral mixture, or by clogging and obstructing the pores or crevices of filtering surfaces, of permeable partitions or diaphragms, or of fluid absorbing or emitting surfaces, or of surfaces designed to have a certain degree of "grain" or roughness, as, for example, the active surfaces of concentrating devices, such as shaking tables of the Wilfley type, vanners, canvas-plants, buddles, amalgamated plates, greased tables, etc. It is my belief that these colloidal matters may interfere with concentration operations whether they exist in a flocculated (or coagulated) or in a deflocculated (or dispersed) condition, but I have found that in general their action is less marked when dispersed or deflocculated.

The present invention in its broad aspect contemplates, as an improvement in the treatment of minerals and more particularly in the concentration of minerals, and as a preliminary step to the separative treatment or concentrating operation proper, the removal, in whole or in part, of colloidal constituents substantially alone from a mineral mixture or pulp, and involves the step of dispersing or deflocculating colloidal matter which would otherwise be present in the mineral mixture or pulp in a flocculated condition. By removal of colloidal constituents substantially alone I mean that the removal of the colloidal constituents is accompanied by no substantial removal from the mineral mixture or pulp of the non-colloidal constituents therein, although there may be, and usually will be, removed from the pulp along with the colloidal constituents, a portion of the water forming the pulp. After the removal of the colloidal constituents from the mineral pulp in accordance with the principles of the present invention, the mineral pulp thus freed of the removed colloidal constituents is subjected to the contemplated separative treatment or mineral treatment operation, such, for example, as a concentration operation.

The removal, by sedimentation and decantation, from a mineral pulp of colloidal constituents depends for its effectiveness upon the relative difference in the rate of settling or sedimentation of the mineral particles and the colloidal constituents. For this reason, it is desirable to cause the colloidal constituents to settle at a much slower rate than the mineral particles in the mineral pulp, whereby, after a predetermined settling of the mineral particles any desired portion of the supernatant liquor containing the slower-settling colloidal constituents can be decanted in any suitable way to effect the removal from the mineral pulp of the desired quantity of the colloidal constituents. In this connection, the present invention contemplates the dispersion or defloccula-tion of the colloidal constituents, so as to cause them to settle at a very much slower rate than would be the case if they were coagulated or flocculated, so that they will remain in more or less permanent suspension in quiet pulp, thus permitting settling or sedimentation of the sands and slimes containing the valuable minerals, and decantation by displacement, or otherwise, of the water containing the suspended colloids or colloidal slimes.

The colloidal constituents of mineral pulps are rarely, if ever, naturally deflocculated and dispersed to their maximum possible extent. Since aggregated or flocculated colloid matters act like solid particles of greater magnitude the removal of the partially flocculated colloidal constituents of a mineral pulp by means of settling processes, or even washing with water on tables or vanners, is generally incomplete and inadequate. The agencies which promote the flocculation of the colloidal constituents of a mineral pulp also in general seem to promote the adsorption or other form of attachment which exists between such colloidal constituents and the granular constituents of the mineral pulp. It follows, therefore, that when the colloidal constituents of a mineral pulp have been thoroughly deflocculated and minutely dispersed they no longer exist in the form of aggregates resembling the coarser solid particles of the pulp, but behave more like substances in solution, and are, in fact, spoken of as being in colloidal solution, in which condition the forces tending to maintain them in suspension are greater than the effect of gravity, thereby greatly facilitating their separation or removal from the mineral pulp by sedimentation and decantation, and as, at the same time, their adsorption or other bond for the coarser solid particles of the mineral pulp is weakened, the removal of such colloidal constituents from the mineral pulp is greatly facilitated over what is possible in their natural partially flocculated condition.

Even when the colloidal constituents of a mineral pulp are originally deflocculated or have been deflocculated early in the treatment of the pulp, they may have become flocculated during the treatment to which the pulp is subjected or agents may have been added which cause them to flocculate and in such cases the same general method of treatment is applied to secure deflocculation in accordance with the principles of this invention as would be applied to a pulp containing naturally flocculated colloidal constituents.

The present invention accordingly contemplates, as a preliminary step to a mineral treatment operation such as concentration, the treatment of the mineral pulp with a deflocculating or dispersing agent in order to convert the colloids or colloidal slimes into a deflocculated or dispersed state (if they are not already present in a sufficiently complete state of dispersion or deflocculation), and the removal or separation of the thus dispersed or deflocculated colloids or colloidal slimes, in whole or in part, by decantation or otherwise, from the mineral pulp prior to the mineral treatment operation. As a result of this removal of the colloids or colloidal slimes in a dispersed or deflocculated condition or state, the mineral pulp is freed from such colloidal matter, to the desired extent, so that the contemplated mineral treatment operation can thereafter be carried out without being prejudiced or inhibited by the colloidal constituents which have been removed.

I have found further that, for certain purposes, it is desirable to retain part of the colloidal constituents in the mineral pulp, and that, when a proper amount of such constituents are present, it is possible to effect a differential separation or concentration of a certain valuable mineral constituent or constituents of a mineral mixture, while the separation of another valuable mineral constituent or constituents is retarded or inhibited by the colloids or colloidal slimes remaining in the mineral pulp; and that, thereafter, by a further removal of a part or all of the remaining colloids or colloidal slimes, in the manner herein contemplated, separation or concentration of the remaining valuable mineral constituent or constituents can be effected.

As a result of the investigations which I have made, I have been led to believe that colloidal adsorption takes place upon metallic surfaces and upon the surfaces of sulfides and other minerals, but that the strength of the adsorption varies considerably, depending upon the character of the colloid, its relative concentration, the kind and character of adsorbing material, and its temperature and condition of electrical charge. I do not, however, desire to limit myself by any theoretical explanation of the principles underlying the present invention. Whatever may be the correct explanation of the prejudicial effect of colloids when present, and of the advantages resulting from their removal, the process of the present invention involves the separation or removal from the mineral pulp of the colloids in a dispersed or deflocculated condition, and in whole or in part, (whether adsorbed by or otherwise combined or admixed with the minerals), as a preliminary or preparatory step to a mineral treatment operation.

Should the mineral pulp contain the colloids or colloidal slimes in a naturally sufficiently dispersed condition, then the treatment with a dispersing or deflocculating agent may not be necessary, and the mineral pulp may be subjected directly to differential sedimentation or decantation for the removal of the colloidal constituents to the desired extent. With the removal of the colloidal constituents, there will, of course, also be removed a corresponding portion of the liquid of the mineral pulp, together with such constituents as are dissolved therein.

If the colloidal slimes of the mineral pulp are not naturally sufficiently dispersed (as is almost universally the case in actual practice), the mineral pulp is treated with a dispersing or deflocculating agent to bring about the desired dispersion or deflocculation of the colloidal constituents, after which decantation (or other appropriate procedure) is employed for the purpose of removing a portion or the whole of the dispersed colloidal constituents and accompanying liquid containing the added agent or agents. The dispersing agent which I have used to particular advantage with many mineral mixtures is sodium silicate, but many other agents are available for effecting the desired dispersion or deflocculation of the colloidal constituents. Using sodium silicate, I have found that good results are obtained with a small amount, for example five per cent down to a fraction of one per cent of the sodium silicate per ton (dry weight) of the mineral mixture being treated. The dispersing or deflocculating agent should be properly chosen with reference to the colloidal properties of the mineral mixture and in accordance with the known principles of colloid chemistry so that the desired deflocculation or dispersion will take place. The nature of the dispersing agent will accordingly vary somewhat with different mineral mixtures, because the colloidal constituents vary, in some cases being of a basic character and in others of an acid character, and in some cases being positively charged, and in other cases being negatively charged. The dispersing agent may thus be of an acid character, in case the colloidal constituents are such as are dispersed by an acid reagent, or of an alkaline character, if the preliminary tests indicate this to be desirable. The agent or agents may themselves partake of a colloidal character as, for example, silicic acid or sodium or potassium silicates, or soaps which also display acid or alkaline characteristics. In addition to the agents hereinbefore mentioned, I have in practice successfully employed gum arabic (acacia), foundry molasses, tri-sodium phosphate, etc., as colloid dispersing agents.

The dispersion of the colloids (whether adsorbed by the mineral particles or otherwise coagulated or flocculated) may be promoted, or even brought about, to a greater or less extent, by rapid circulation and agitation of the pulp, which will serve to distribute the deflocculating agent, if any is used, and cause abrasion of the mineral particles with each other and with floccules or coagules of colloidal matter in which the mineral particles may be enmeshed, so that the separated and dispersed colloids may be more readily removed by decantation. Increase or decrease in temperature may similarly be of assistance in bringing the colloids into a state permitting their removal from the mineral pulp. The optimum temperature in the case of any particular mixture, for effecting dispersion of the colloidal constituents contained in the mineral mixture, may be determined by tests, in which the other factors are held constant and the temperature varied through a wide range. Where this optimum temperature is higher than the normal temperature of the mineral pulp, the mineral pulp may be heated to the desired temperature by direct heating or by the use of steam-heating coils, or by steam blown into the pulp, and where this optimum temperature is lower than the normal temperature of the mineral pulp, the pulp may be cooled by dilution with cold water, by cooling coils, by cooling towers, etc.

I have found that the necessary distribution of the dispersing or deflocculating agent through the mass of the mineral mixture, and the contemplated dispersion or deflocculation of the colloids or colloidal slimes present in the mineral mixture, can be very conveniently and effectively brought about by adding the deflocculating or dispersing agent to the mineral pulp at some point prior to the admission of the mineral mixture to the ball or pebble mills, or other fine grinding machines. Such machines almost invariably form a part of the equipment of concentrating plants. By so adding the deflocculating or dispersing agent to the mineral mixture ahead of the fine grinding mills, the necessary admixture is secured without inconvenience or added expense, and the dispersion or deflocculation of the colloids or colloidal slimes may take place under the most favorable conditions of temperature and violent agitation. Under these conditions, floccules or coagules are readily broken up and prevented from reforming, or particles already coated with colloids or enmeshed within floccules are cleaned or released. Such colloids as are released from a solid or indurated condition by the grinding are immediately placed in the dispersed or deflocculated state and the fresh mineral surfaces exposed by the grinding are prevented from being coated with inhibitory coatings of colloidal material. This procedure may with some mineral mixtures be sufficient to effect the desired degree of deflocculation without the use of a deflocculating agent provided the decantation of the colloidal constituents is effected immediately after the pulp leaves the grinding machine, it being, of course, understood that the removal by decantation of the colloidal constituents in a dispersed state must take place when the mineral pulp is relatively quiescent, and cannot be satisfactorily carried out while the pulp is undergoing such agitation as will interfere with the desired settling of the non-colloidal constituents.

Whatever may be the preliminary treatment, or combination of treatments, to which the mineral pulp is subjected for the dispersion or deflocculation of its colloids, these colloids are, according to the present invention, removed (by decantation or otherwise) in a dispersed condition from the mineral pulp to the extent necessary to prevent them from interfering with the subsequent treatment of the mineral pulp. Such removal of the colloids in a dispersed condition may take place in tanks such as those of the Dorr, Allen or Callow types. With the overflow from such tanks there will be removed a corresponding amount of liquid so that the mineral mixture will become thickened. So much of the liquid may, in fact, be removed that only sufficient liquid and accompanying slimes remain to permit the handling of the pulp as by pumping and its preparation for the next step in the process.

After the deflocculated or dispersed colloids or colloidal slimes have been removed to the desired extent (that is, in whole or in part depending upon the result desired), the remaining mineral pulp, which is now in a more concentrated state with respect to its solid phase, is subjected to the contemplated mineral treatment operation. To this end, the pulp may be further thickened or dried, or it may be diluted, depending upon the nature of the subsequent mineral treatment operation. In the ordinary concentration operations, the mineral pulp is diluted with colloid-free liquid to the proper consistency and then subjected to appropriate treatment for securing separation of the valuable minerals from the waste or less valuable minerals. The removal of the colloids from the mineral mixture often enables the mineral mixture to be treated in a state of greater density, that is, in a more concentrated form with respect to its solid phase, with the result that an increased tonnage of mineral mixture can be handled by a given plant.

The colloidal slimes which are separated from the mineral pulp are commonly of a character such that they may be run to waste. In case, however, the slimes carry sufficient values, they may be themselves subjected to a further treatment for the recovery of the values therefrom. For example, they may be subjected to a flotation treatment, for the separation of valuable minerals therefrom, or they may be subjected to other appropriate treatment for the recovery of values.

The liquid accompanying the removed colloids may be separated and recovered for reuse. The colloids contained therein may thus be coagulated and settled or filtered out. The liquid separated from the colloids may be purified, if necessary, to free it from dissolved salts prejudicial to the mineral treatment operation in which it is to be subsequently used, or prejudicial to the maintenance of the desired state of dispersion of the mineral mixture to which it may be subsequently added.

If the original mineral mixture contains several valuable ingredients such as sulfides, the removal of the colloidal constituents in accordance with the principles of the present invention may be carried out in a number of stages in order to take advantage of the selective inhibition of the colloids or colloidal slimes toward the selection of certain of the minerals. For example, in a mixed sulfide mineral mixture, containing sulfides of lead, zinc and iron, which it is desired to treat by the well known froth flotation process, the mineral mixture may be treated for the removal of a portion only of the colloidal slimes in the manner hereinbefore described, so that there will be retained in the mineral pulp sufficient of the colloids to prevent any considerable flotation of the iron and zinc sulfides while permitting the flotation of the lead sulfide, whereby there can be obtained by flotation a lead concentrate relatively free from zinc and iron. The remaining mineral pulp (tails from the aforementioned flotation operation) may then be treated for the removal of an additional portion of the colloids, whereby flotation of the zinc, or flotation of the zinc and iron, may be readily effected. Where the zinc is floated without flotation of the iron, a still further removal of the colloids from the remaining mineral pulp may then be effected in order to permit flotation of the iron sulfide. In carrying out differential flotation of different minerals, advantage may also be taken, in each case, of the well known selective qualities of certain oils or other flotation agents, for the various minerals, such selective qualities supplementing the selectively inhibitory action of the colloidal constituents.

It will be seen that the present invention thus involves the separation from the mineral pulp, prior to concentration or other mineral treatment operation, of colloidal constituents in a dispersed or deflocculated state, so that the concentration or other mineral treatment operation is carried out without interference from the colloids, or with such regulated action of the remaining colloids as is desirable for the particular object in view, as in case a differential separation of certain minerals is desired. This preliminary separation of the colloidal constituents in a dispersed condition may be readily effected by a simple overflow or decantation of the dispersed colloids; liquid being subsequently added to dilute the resulting thickened pulp, if necessary or desired for the subsequent mineral treatment operation. The decantation may be carried out on the countercurrent principle by the use of a series of tanks arranged for counterflow of the mineral pulp and of the overflow, so that a more or less complete separation of the dispersed colloids may be effected and the amount thereof regulated.

Where the mineral pulp contains, in solution in the liquid thereof, substances which prevent dispersion or deflocculation of the colloids, such substances may be in part or in whole removed, as for example, by the removal of the liquid from the mineral pulp, prior to the dispersion or deflocculation treatment, or they may be otherwise neutralized and rendered harmless by methods and agents which are generally known, and can be regulated by simple tests. For example, an excessive quantity of magnesium sulfate or of some other electrolyte in the mineral pulp may interfere with the proper action of sodium silicate as a dispersing agent. Such a condition may be corrected by washing the mineral for the removal of soluble salts. Where the mineral pulp is acid or where there is latent acidity, due to the occlusion of sulfur dioxide, an alkali may be added to correct the acidity, whereby the sodium silicate is enabled to act in the desired manner.

The present invention is applicable to different concentration processes and with various means or reagents or agents which are used to effect or facilitate concentration. Thus, the amalgamation of certain ores of gold and silver has proved difficult or impracticable because of the presence of oil, grease, tallow, talc, serpentine, graphite, clay and other substances. The "saprolitic ore" of the Appalachian gold belt is an example. When substances of colloidal character, such as those mentioned and many others, are present in the ore pulp, they seem to attach themselves to or to combine with the precious metal or the amalgam, or to both. The result may be "hard" amalgam or "sickening" or "flouring" of the mercury, resulting in failure of the amalgam to catch and retain the precious metal. Simple tests will serve to show whether loss of precious metal values is indeed due, in any given instance, to the presence of such substances, and equally simple tests, which may be performed by anyone skilled in the art to which this invention relates, will develop what reagents are required to produce or maintain a dispersed or deflocculated condition of the injurious colloidal constituents, so that they may be withdrawn from the ore pulp to the desired extent before the latter is subjected to amalgamation treatment for the recovery, in concentrated form, of its precious metal content.

In cyanidation, chlorination, acid or alkali leaching or similar processes of concentration of mineral mixtures, the presence of colloidal constitutents may be objectionable in various ways, as by adsorption or other form of attachment of the colloidal constituents by the valuable mineral particles, or by adsorption by the colloidal constituents of the reagents used in or preliminarily to the process of concentration, or by neutralization or other form of chemical combination of the added reagents with the colloidal constituents (the extremely fine state of division of the latter often serving to permit reactions which would be either nonexistent or too slow to be troublesome between such reagents and coarser particles having chemical composition similar to that of the colloidal constituents); or by mechanical interference with the porosity or permeability of the mineral mixture, or of parts of the necessary apparatus, thus injuriously affecting the percolation of solutions, the functioning of porous septa or diaphragms, etc.

In such chemical or quasi-chemical methods of concentration, it is common to preliminarily separate the slimed from the granular portion of the mineral pulp and treat these portions separately by processes depending upon the same or different principles. From such a procedure, the method of the present invention is readily distinguishable, since it is not my purpose to separate the slime as a whole from the granular portion of the mineral pulp, but, on the contrary, the present invention involves the separation of the colloidal constituents in a dispersed condition from the slime and granular material. Thus, the application of the invention in a given instance may, by the withdrawal of the colloidal constituents, render unnecessary any separation of the slimes from the sands, and the thus withdrawn colloidal matter may be of such character as not to require or deserve treatment, or it may be so slight in quantity compared with the slime as a whole as to require smaller apparatus or a less quantity of reagents.

The adsorption or other form of attachment of the colloidal constituents of a mineral mixture to the granular particles thereof is a matter of common knowledge. Regardless of whether the actual concentration of the valuable mineral is effected from a pulp or from a dry mineral mixture, the preliminary withdrawal of the colloidal constituents in accordance with the principles of the present invention generally leads to improved results. Thus, the colloidal matter, if valuable, may be saved from being lost with the granular waste minerals to which it is in part adherent, whilst, if valueless, it may thus be prevented from adhering to and contaminating, the concentrate particles. These considerations are of moment in the preparation of a mineral mixture for dry electrostatic or magnetic concentration. Similarly, in wet magnetic concentration, the presence of colloidal matter, particularly when flocculated, may injuriously affect the freedom with which the magnetic particles may be separated from the remainder of the pulp, the slightest entanglement of the magnetic particles being the cause of inferior concentration.

In the process of jigging mineral pulps, it might be supposed, since relatively coarse particles are dealt with, that colloidal constituents might have unimportant influence. On the contrary, it is known that "slimes" when present in the ore being jigged, may seriously interfere with the operation, because they segregate in the place where the agitation is not so severe, or where there are eddy-currents, and form "hard spots," or they may render the jig-bed dense and "gummy." It is, indeed, sometimes the case that the slimes form spots or rims in the jig-bed, through which gangue finds its way into the jig-tank or "hutch." I have discovered that this well known and objectionable action of slimes in jigging may be overcome if the colloidal constituents of the pulp are withdrawn therefrom, in the manner set forth in this specification, before jigging, and it seems probable that the reason for this improvement in results is to be found in the fact that when the colloidal constituents are absent the intersticial spaces in the slimes are filled with water, having low viscosity, instead of with a colloid-water complex having high viscosity, and the mobility of the jig-bed is thereby insured, permitting it to function, as desired, in accordance with the laws of "hindered settling." The effect of the removal of colloidal constituents is in general quite marked. In a specific case I have found that in jigging on a Hancock jig a pulp consisting of the sulfids of lead, zinc and iron in a dolomite gangue, all particles of which were through a screen with one-quarter inch square openings, that it was necessary to remove all material finer than fourteen-mesh Tyler Standard, in order to permit satisfactory jigging; unless the colloidal constituents were preliminarily withdrawn from the pulp, in accordance with the disclosure of this specification. When this was done, it was no longer necessary to screen or hydraulicly classify the pulp, but the entire pulp, minus the withdrawn colloidal constituents, could be jigged with satisfactory results. Preliminary removal of the colloidal constituents frequently permits also of greater economy in the use of water, and allows the jig water to be used over and over without being clarified.

I have previously alluded to the beneficial results which follow the withdrawal of colloidal constituents from pulp which is to be treated on shaking or bumping tables, vanners, bateas, slime-tables, buddles, canvas-, carpet, or blanket-plants, etc. In all such devices it is of great importance that the mobility of the pulp-mass be insured, in order to permit of the requisite stratification of minerals, graded by density, size and shape, and that the pulp receiving surface of the device be maintained in its original grained, pitted or otherwise uniformly-roughened condition. If the intersticial spaces of the pulp are filled with colloidal constituents the heavy minerals cannot readily settle to the lowest stratum and the lightest minerals cannot readily separate at the top and wash away. If the minute pits or depressions of the linoleum, wood, concrete, rubber, metal, cloth, or other material of which the acting surface of the device is composed, become filled with colloidal matter, the effect is the same as though the table top were lubricated or made of perfectly smooth and frictionless material. Under such conditions the forward driving effect of the table-top is lost, (in devices like the Wilfley table where this action is a factor), or the desired conditions of particle equilibrium are disturbed, so that certain particles continue to slip under conditions in which they should come to, and continue at, rest.

The effects of the colloidal constituents of mineral pulps in interfering with classification of minerals by screening and hydraulic classification have been recognized. In screening, the colloidal matter, particularly if flocculated, tends to remain in part with the coarse product, clogs the screen openings and entangles fine particles. In hydraulic classification, both according to "free-settling" and "hindered-settling" principles, the presence of colloidal matter is objectionable. As previously stated, the colloidal constituents tend to envelop fine particles, adhere to coarse grains, and to hold excess water in the settled mass, by virtue both of their intrinsic water-holding ability and by the wider spacing of particles which results from their presence. The effect of the colloidal constituents in affecting the density and viscosity of the liquid of the pulp, has been referred to. In devices like classifiers, jigs, settling tanks, kieves, etc., in which the principles of "free-" or "hindered-settling" classification are usefully employed, the presence of the colloidal constituents of the mineral pulp may be, and often is, harmful. Their adverse influence may be overcome by withdrawing them from the pulp to the degree desired, in accordance with the principles and methods set forth in this specification.

In my copending application, Serial No. 283,628, filed March 19, 1919, I have described and claimed a method of improving the flotation of minerals in which method the flotation treatment of the mineral pulp is a particular mineral treatment operation to the improvement of which the principles of the present invention are applied.

I claim:

1. The method of improving the treatment of minerals associated with colloidal constituents in a mineral pulp, which consists in removing colloidal constituents substantially alone from the mineral pulp, said removal of colloidal constituents being preceded by the step of dispersing or deflocculating colloidal matter which would otherwise be present in the pulp in a flocculated condition, and thereafter subjecting the remaining pulp to a separative treatment in which such colloids as have been removed from the pulp would, if present, exert a deleterious effect.

2. The method of improving the treatment of minerals associated with colloidal constituents in a mineral pulp, which consists in removing colloidal constituents substantially alone from the mineral pulp by decantation in the course of which a portion of the water forming the pulp is also removed, said removal of colloidal constituents being preceded by the step of dispersing or deflocculating colloidal matter which would otherwise be present in the pulp in a flocculated condition, and thereafter subjecting the remaining pulp to a separative treatment in which such colloids as have been removed from the pulp would if present exert a deleterious effect.

3. The method of improving the treatment of minerals associated with colloidal constituents in a mineral pulp, which consists in removing colloidal constituents substantially alone from the mineral pulp, said removal of colloidal constituents being preceded by the step of adding to the mineral pulp a dispersing or deflocculating agent for promoting dispersion or deflocculation of colloidal constituents therein, and thereafter subjecting the remaining pulp to a separative treatment in which such colloids as have been removed from the pulp would if present exert a deleterious effect.

4. The method of improving the treatment of minerals associated with colloidal constituents in a mineral pulp, which consists in removing colloidal constituents substantially alone from the mineral pulp by decantation in the course of which a portion of the water forming the pulp is also removed, said removal of colloidal constituents being preceded by the step of adding to the mineral pulp a dispersing or deflocculating agent for promoting dispersion or deflocculation of colloidal constituents therein, and thereafter subjecting the remaining pulp to a separative treatment in which such colloids as have been removed from the pulp would if present exert a deleterious effect.

5. The method of improving the treatment of minerals associated with colloidal constituents in a mineral pulp, which consists in removing colloidal constituents substantially alone from the mineral pulp, said removal of colloidal constituents being preceded by the step of dispersing or deflocculating colloidal matter which would otherwise be present in the pulp in a flocculated condition, thereafter subjecting the remaining pulp to a separative treatment in which such colloids as have been removed from the pulp would if present exert a deleterious effect, removing colloidal constituents from the now remaining mineral pulp, and thereafter subjecting the remaining mineral pulp to a further separative treatment in which such colloids as have been removed therefrom would if present exert a deleterious effect.

6. The method of improving the treatment of minerals associated with colloidal constituents in a mineral pulp, which consists in removing colloidal constituents substantially alone from the mineral pulp, said removal of colloidal constituents being preceded by the step of agitating and regulating the temperature of the mineral pulp in the presence of a dispersing or deflocculating agent for promoting dispersion or deflocculation of flocculated colloidal constituents therein, and thereafter subjecting the remaining pulp to a separative treatment in which such colloids as have been removed therefrom would if present exert a deleterious effect.

7. The method of improving the treatment of minerals associated with colloidal constituents in a mineral pulp, which consists in removing colloidal constituents substantially alone from the mineral pulp, said removal of colloidal constituents being preceded by the step of agitating the mineral pulp in the presence of a dispersing or deflocculating agent for promoting dispersion or deflocculation of flocculated colloidal constituents therein, and thereafter subjecting the remaining pulp to a separative treatment in which such colloids as have been removed therefrom would if present exert a deleterious effect.

8. The method of improving the treatment of minerals associated with colloidal constituents in a mineral pulp, which consists in removing colloidal constituents substantially alone from the mineral pulp, said removal of colloidal constituents being preceded by the step of regulating the temperature of the mineral pulp in the presence of a dispersing or deflocculating agent for promoting dispersion or deflocculation of flocculated colloidal constituents therein, and thereafter subjecting the remaining pulp to a separative treatment in which such colloids as have been removed therefrom would if present exert a deleterious effect.

9. The method of improving the treatment of minerals associated with colloidal constituents in a mineral pulp, which consists in removing colloidal constituents substantially alone from the mineral pulp, said removal of colloidal constituents being preceded by the step of subjecting the mineral pulp to a grinding operation in the presence of a dispersing or deflocculating agent for promoting dispersion or deflocculation of flocculated colloidal constituents therein, and thereafter subjecting the remaining pulp to a separative treatment in which such colloids as have been removed therefrom would if present exert a deleterious effect.

10. The method of improving the treatment of minerals associated with colloidal constituents in a mineral pulp, which consists in removing colloidal constituents substantially alone from the mineral pulp, said removal of colloidal constituents being preceded by the step of heating the mineral pulp in the presence of a dispersing or deflocculating agent for promoting dispersion or deflocculation of flocculated colloidal constituents therein, and thereafter subjecting the remaining pulp to a separative treatment in which such colloids as have been removed therefrom would if present exert a deleterious effect.

11. The method of improving the treatment of minerals associated with colloidal constituents in a mineral pulp, which consists in removing colloidal constituents substantially alone from the mineral pulp, said removal of colloidal constituents being preceded by the step of adding to the mineral pulp a dispersing or deflocculating agent for promoting dispersion or deflocculation of flocculated colloidal constituents therein, thereafter subjecting the remaining pulp to a separative treatment in which such colloids as have been removed from the pulp would if present exert a deleterious effect, removing colloidal constituents from the now remaining mineral pulp, and thereafter subjecting the remaining mineral pulp to a further separative treatment in which such colloids as have been removed therefrom would if present exert a deleterious effect.

12. The method of improving the treatment of minerals associated with colloidal constituents in a mineral pulp, which consists in removing colloidal constituents from the mineral pulp, thereafter subjecting the remaining pulp to a separative treatement in which such colloids as have been removed from the pulp would if present exert a deleterious effect, then adding to the now remaining mineral pulp a dispersing or deflocculating agent for promoting dispersion or deflocculation or flocculated colloidal constituents therein, removing colloidal constituents substantially alone from the remaining mineral pulp, and thereafter subjecting the remaining mineral pulp to a further separative treatment in which such colloids as have been removed therefrom would if present exert a deleterious effect.

13. The method of improving the treatment of minerals associated with colloidal constituents in a mineral pulp, which consists in removing colloidal constituents from the mineral pulp, thereafter subjecting the remaining pulp to a separative treatment in which such colloids as have been removed from the pulp would if present exert a deleterious effect, then treating the now remaining mineral pulp to promote dispersion or deflocculation of flocculated colloidal constituents therein, removing from the remaining pulp colloidal constituents substantially alone and in a dispersed or deflocculated condition, and thereafter subjecting the remaining mineral pulp to a further separative treatment in which such colloids as have been removed therefrom would if present exert a deleterious effect.

14. The method of improving the treatment of minerals associated with colloidal constituents in a mineral pulp, which consists in removing colloidal constituents substantially alone from the mineral pulp, said removal of colloidal constituents being preceded by the step of dispersing or deflocculating colloidal matter which would otherwise be present in the pulp in a flocculated condition, thereafter subjecting the remaining pulp to a separative treatment in which such colloids as have been removed from the pulp would if present exert a deleterious effect, then treating the now remaining mineral pulp to promote dispersion or deflocculation of flocculated colloidal constituents therein, removing colloidal constituents from the remaining mineral pulp, and thereafter subjecting the remaining mineral pulp to a further separative treatment in which such colloids as have been removed therefrom would if present exert a deleterious effect.

15. The method of improving the treatment of minerals associated with colloidal constituents in a mineral pulp, which consists in removing colloidal constituents substantially alone from the mineral pulp, said removal of colloidal constituents being preceded by the step of adding to the mineral pulp a dispersing or deflocculating agent for promoting dispersion or deflocculation of flocculated colloidal constituents therein, thereafter subjecting the remaining pulp to a separative treatment in which such colloids as have been removed from the pulp would if present exert a deleterious effect, then adding to the now remaining mineral pulp a dispersing or deflocculating agent for promoting dispersion or deflocculation of flocculated colloidal constituents therein, removing colloidal constituents from the remaining mineral pulp, and thereafter subjecting the remaining mineral pulp to a further separative treatment in which such colloids as have been removed therefrom would if present exert a deleterious effect.

16. The method of improving the treatment of minerals associated with colloidal constituents in a mineral pulp, which consists in removing from the mineral pulp colloidal constituents substantially alone and in a dispersed or deflocculated condition, said removal of colloidal constituents being preceded by the step of dispersing or deflocculating colloidal matter which would otherwise be present in the pulp in a flocculated condition, and thereafter subjecting the remaining pulp to a separative treatment in which such colloids as have been removed from the pulp would if present exert a deleterious effect.

17. The method of improving the treatment of minerals associated with colloidal constituents in a mineral pulp, which consists in removing from the mineral pulp colloidal constituents substantially alone and in a dispersed or deflocculated condition, said removal of colloidal constituents being preceded by the step of adding to the mineral pulp a dispersing or deflocculating agent for promoting dispersion or deflocculation of colloidal constituents therein, and thereafter subjecting the remaining pulp to a separative treatment in which such colloids as have been removed from the pulp would if present exert a deleterious effect.

18. The method of improving the concentration on shaking tables of minerals associated with colloidal constituents in a mineral pulp, which consists in removing colloidal constituents substantially alone from the mineral pulp, said removal of colloidal constituents being preceded by the step of dispersing or deflocculating colloidal matter which would otherwise be present in the pulp in a flocculated condition, and thereafter subjecting the remaining pulp to concentration on a shaking table in which such colloids as have been removed from the pulp would if present exert a deleterious effect.

19. The method of improving the concentration on shaking tables of minerals associated with colloidal constituents in a mineral pump, which consists in removing colloidal constituents substantially alone from the mineral pulp, said removal of colloidal constituents being preceded by the step of adding to the mineral pulp a dispersing or deflocculating agent for promoting dispersion or deflocculation of colloidal constituents therein, and thereafter subjecting the remaining pulp to concentration on a shaking table in which such colloids as have been removed from the pulp would if present exert a deleterious effect.

20. The method of improving the concentration on shaking tables of minerals associated with colloidal constituents in a mineral pulp, which consists in removing colloidal constituents substantially alone from the mineral pulp by decantation in the course of which a portion of the water forming the pulp is also removed, said removal of colloidal constituents being preceded by the step of dispersing or deflocculating colloidal matter which would otherwise be present in the pulp in a flocculated condition, and thereafter subjecting the remaining pulp to concentration on a shaking table in which such colloids as have been removed from the pulp would if present exert a deleterious effect.

21. The method of improving the concentration on shaking tables of minerals associated with colloidal constituents in a mineral pulp, which consists in removing from the mineral pulp colloidal constituents substantially alone and in a dispersed or deflocculated condition, said removal of colloidal constituents being preceded by the step of dispersing or deflocculating colloidal matter which would otherwise be present in the pulp in a flocculated condition, and thereafter subjecting the remaining pulp to concentration on a shaking table in which such colloids as have been removed from the pulp would if present exert a deleterious effect.

22. The method of improving the concentration on shaking tables of minerals associated with colloidal constituents in a mineral pulp, which consists in removing from the mineral pulp colloidal constituents substantially alone and in a dispersed or deflocculated condition by decantation in the course of which a portion of the water forming the pulp is also removed, said removal of colloidal constituents being preceded by the step of dispersing or deflocculating colloidal matter which would otherwise be present in the pulp in a flocculated condition, and thereafter subjecting the remaining pulp to concentration on a shaking table in which such colloids as have been removed from the pulp would if present exert a deleterious effect.

In testimony whereof I affix my signature.

WALTER O. BORCHERDT.